United States Patent [19]

Eveson et al.

[11] 4,284,879

[45] Aug. 18, 1981

[54] METHODS OF CONTAINING FLUIDS DELETERIOUS TO THE CONTAINER

[75] Inventors: Geoffrey F. Eveson, Grimsby; Alan W. Scruby, Brigg, both of England

[73] Assignee: Laporte Industries Limited, England

[21] Appl. No.: 48,505

[22] Filed: Jun. 14, 1979

Related U.S. Application Data

[63] Continuation of Ser. No. 683,715, May 6, 1976, abandoned.

[30] Foreign Application Priority Data

May 21, 1975 [GB] United Kingdom ............... 21715/75

[51] Int. Cl.³ .............................................. H01H 1/00
[52] U.S. Cl. ................................. 219/383; 219/121 P; 422/240; 422/242; 423/611; 423/612; 137/13
[58] Field of Search ................. 219/121 P, 123, 383, 219/75; 23/259.5; 204/164, 312; 315/111, 111.2; 13/11, 20, 22; 313/161, 231; 48/197; 423/611; 137/13; 422/240, 242

[56] References Cited

U.S. PATENT DOCUMENTS

| | | | |
|---|---|---|---|
| 3,307,567 | 3/1967 | Gogarty et al. ...................... | 137/13 |
| 3,332,870 | 7/1967 | Orbach et al. ....................... | 423/659 |
| 3,695,840 | 10/1972 | Pfender ............................... | 423/659 |
| 3,840,344 | 10/1974 | Garbo ................................. | 23/259.5 |
| 3,933,434 | 1/1976 | Matovich ............................ | 219/390 |
| 3,982,586 | 9/1976 | Ryble ................................. | 23/259.5 |
| 4,042,334 | 8/1977 | Matovich ........................... | 23/259.5 |
| 4,056,704 | 11/1977 | Beach et al. ....................... | 219/383 |

*Primary Examiner*—Gene Z. Rubinson
*Assistant Examiner*—Bernard Roskoski
*Attorney, Agent, or Firm*—Kane, Dalsimer, Kane, Sullivan and Kurucz

[57] ABSTRACT

Fluid permeable wall members through which an auxiliary fluid is passed against pressure exerted by a fluid to be contained, which wall member is composed of inorganic fibres, may be used to contain hot fluids or fluids otherwise having a deleterious effect on the wall members. Vacuum formed shapes composed of refractory inorganic fibres may be used to contain fluids having temperatures of over 2500° C. such as gases which have been heated by electrical discharge means for use in the vapor phase manufacture of oxides of titanium, iron, aluminium, silicon or zirconium and offer low capital costs combined with resistance to thermal shock.

6 Claims, 1 Drawing Figure

METHODS OF CONTAINING FLUIDS DELETERIOUS TO THE CONTAINER

This is a continuation of application Ser. No. 683,715, filed May 6, 1976 abandoned.

BACKGROUND OF THE INVENTION

1. Field of the Invention

This invention relates to the containment of fluids.

2. Brief Description of the Prior Art

Problems may arise in connection with the containment of fluids which have a deleterious effect on the materials of construction of the containing vessel by reason of, for example, the reaction of the fluid, or of a constituent therein, with the material of construction of the containing vessel, the deposition of a solid from the fluid onto the wall of the containing vessel, or changes which may occur in the material of the containing vessel by reason of the fluid having either a sufficiently low temperature or a sufficiently high temperature to cause breakdown of the walls of the containing vessel by, for example, melting.

One method of overcoming the above problem is to reduce the contact between a first such fluid and the walls of the containing vessel by use of a permeable wall member through which an auxiliary fluid is passed into said vessel.

The material of construction of the permeable wall member may be permeable amorphous carbon, or graphite, or may be a metal or a refractory ceramic foam with continuous interconnecting pores. Such materials may be expensive and difficult to fabricate, and, particularly in the case of a refractory ceramic foamed structure, may be very sensitive to either thermal or physical shock. Such difficulties have limited the application of this technique of fluid containment.

SUMMARY OF THE INVENTION

The invention provides a method and apparatus for containing a fluid by means of a permeable wall member wherein the fluid to be contained would have a deleterious effect on the wall member on contact therewith but wherein the degree of the said contact is reduced by passing an auxiliary fluid through the wall member against the pressure exerted on the wall member by the fluid to be contained and wherein the permeable wall member is constructed of inorganic fibres.

DETAILED DESCRIPTION OF THE PREFERRED EMBODIMENTS OF THE INVENTION

Figure 1:
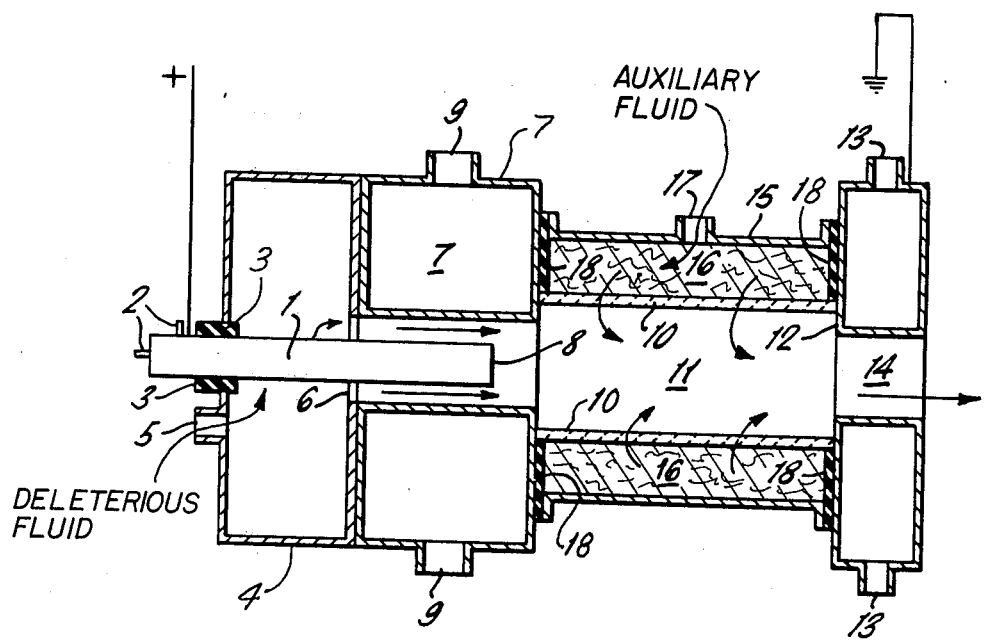
FIG. 1 is a part longitudinal section, not to scale, through apparatus according to the invention.

The auxiliary fluid must not cause any undesired effect on the fluid to be contained or on the wall member by reason, for example, of chemical reaction with the constituents of the fluid to be contained or of physical change in the wall member due to temperature effects. The auxiliary fluid may react with the first fluid to prevent solids deposition, or may act as an inert barrier to reaction between the first fluid with material of construction of the wall member, or may, by reason either of having a higher temperature or a lower temperature than that of the first fluid, maintain the wall member at a temperature at which it is physically stable. The auxiliary gas may be similar in composition to the gas to be contained.

While the invention is applicable to any of the problem situations envisaged above and while in the broadest aspect of the invention the fluid may be either a liquid or a gas, the invention is particularly applicable to the containment of hot gases; including hot vapours; for example the containment of gases having a temperaure at least equal to the minimum sintering, melting or thermal decomposition temperature of the wall member, the auxiliary gas having a temperature below the said minimum sintering or melting temperature. Hereafter the invention will be particularly described with reference to the containment of gases, but without thereby intending any limitation thereto.

The words "sintering", "melting" and "thermal decomposition" are used as alternatives since different inorganic fibres may deteriorate in different ways on heating to above the temperature at which they are stable. To eliminate confusion the lowest temperature at which the porosity and strength of a fibre is affected to any practical extent due to any one of the above properties is indicated hereafter by the general term "minimum deterioration temperature".

The effect of the auxiliary gas is thought to be twofold. Where a hot gas is to be contained the auxiliary gas exerts a cooling effect on the material of the wall. If a hot gas is flowing through a vessel or duct comprising the permeable wall member it may be possible to stabilise the boundary layer of the hot gas adjacent to the permeable wall by means of the auxiliary gas. The Reynolds number of the boundary layer may be reduced by the introduction of the auxiliary gas and it may be possible to introduce sufficient gas through the porous wall member to convert a turbulent boundary layer into a laminar boundary layer, the effect being to reduce the rate of convective heat transfer from the gas to the wall. The combination of these two effects may result in the establishment of a wall temperature which is substantially below that of the hot fluid and also below the minimum deterioration temperature of the fibres, of which the permeable wall is constructed, occurs.

Structures composed of inorganic fibres have been used as heat insulators in a wide variety of applications. The present invention differs from previous practice in utilising such structures in applications where an auxiliary fluid is passed through the structure against the pressure of a fluid to be contained. In such applications readily formed durable structures composed of inorganic fibres may replace the costly and fragile types of permeable materials referred to above.

There may be utilised in the practice of this invention any of a wide range of materials made of inorganic fibres. Examples of such materials are mineral wool, asbestos felt, glass fibre, silicon nitride or carbide fibres or carbon fibres. Preferably there is utilised in the practice of this invention refractory ceramic fibres made, for example, of alumina, silica, zirconia or silica/alumina. Such refractory ceramic fibres are recommended by their manufacturers for continuous use as heat insulators in the range of about 1000° C. to 1500° C. or, for short duration use only in the range of from 1500° C. up to, in the case of some fibres, above 2000° C. Above such recommended temperatures the fibres may sinter or melt. Refractory ceramic fibres may be manufactured by passing a molten ceramic oxide through an orifice and subjecting the resulting stream to a high pressure jet of steam or gas so as to attenuate the stream to fine fibres. Organic binders are commonly sprayed in to assist in the eventual formation of the resulting material into a felt or into a more dense compressed structure, made, for example, by vacuum moulding techniques. Such organic binders burn out at a temperature of about 300° C. There may be slight (i.e. up to 6% linear) irreversible shrinkage at a temperature of somewhat above 1000° C. At temperatures between this and the minimum deterioration temperature of the fibres structures made from the fibres are dimensionally and chemically stable. Structures formed from such fibres by vacuum forming techniques may have a density in the range of from 0.16 to 0.80 g/cu cm and considerable mechanical strength in relation to their weight.

The following Tables list suitable commercially available refractory ceramic fibres:

| Ref. | Trade Mark | Manufacturer |
| --- | --- | --- |
| 1. | Triton Kaowool | Moryanite Fibres |
| 2. | Saffil Fibres | I.C.I. Mond Division |
| 3. | Refrasil | Chemical and Insulating |
| 4. | Procal | Foseco F.S. Ltd. |
| 5. | Fiberfax | Carborundum Ltd. |
| 6. | McKechnie | McKechnie Refractory Fibres Ltd. |

| Ref. | M.P. °C. | Recommended Operating Temp. °C. | Composition Wt. % |
| --- | --- | --- | --- |
| 1. | 1760 | 1260 | ($al_2O_3$ 43–47 ($SiO_2$ 50–54 |
| 2. | >2500 | 1400–1600 | $SrO_2$ |
|  | >2000 | 1000–1400 | $Al_2O_3$ |
| 3. | 1700 | 1000 | $SiO_2$ |
| 4. |  | 1260 | $SiO_2$ 75 $Al_2O_3$ 22 |
| 5. | >1750 | 1260 | $Al_2O_3$ 51 $SiO_2$ 47 |
| 6. | 1780-14 1925 | 1260–1400 | ($Al_2O_3$ 50–61 ($SiO_2$ 49–38) |

In conducting processes based on an endothermic, or on an insufficiently exothermic gas phase reaction it may be necessary to supply heat to the reaction by heating one or more of the reactants, for example air or oxygen in the case of an oxidation reaction, or by conducting the reaction in the presence of a heated inert gas, for example nitrogen or argon. An example of such a gas phase reaction is manufacture of an oxide of an element selected from the group consisting of a titanium, iron, aluminum, silicon or zirconium by reacting a chloride of the element with an oxidising gas in the vapor phase to produce a gaseous suspension of solid particles of the oxide. In conducting such a process it is necessary to supply sufficient heat to raise the temperature of the mixed reactants to at least 700° C. were they to be mixed without reaction occurring. In such processes there are difficulties associated with pre-heating the metal chloride and it has therefore been proposed to preheat either a diluent gas or the oxidising gas to a temperature above 2000° C. by electrical discharge means. In our copending U.K. Patent Application No. 26413/75, which corresponds to our pending U.S. patent application Ser. No. 579,635, now U.S. Pat. No. 4,056,704 there are described an apparatus and process suitable for heating the very large quantities of gases required for use in the very large scale production units which have been developed in the chemical industry, for example for use in processes for the production of titanium dioxide by the oxidation of titanium tetrachloride, on a scale which produces a quantity of product in the range of from 20,000 to 50,000 tons per annum from a single production unit. The said copending application discloses an apparatus comprising a heating zone, means for the supply of a gas to be heated thereto and means for the removal of the heated gas therefrom, and upstream and downstream electrode means adapted for the establishment of a distributed electrical discharge in the heating zone, the means arranged for the supply of gas to the heating zone comprising a plurality of adjacently positioned conduits arranged to constrain the gas supplied to the heating zone at its point of entry thereto into a plurality of substantially parallel streams and the upstream electrode means comprising a plurality of electrodes positioned respectively in the said plurality of gas streams.

Advantageously the present invention may be used in containing a gas stream heated, by the technique described in the copending application referred to above, by other electrical discharge techniques or by combustion techniques, the gas stream being in the heating zone or in gas transport ducts downstream thereof. Preferably the zone in which the heating occurs and any transport ducts downstream of the heating zone are bounded by permeable side walls formed of a compressed mass of refractory ceramic fibres and an auxiliary gas having a temperature below the melting point of the refractory ceramic fibres is passed through the permeable wall member into the heating zone. The invention is particularly suitable for use where electrical discharge heating means are used in view of the high electrical resistivity of many inorganic fibres and particulary of the refractory ceramic fibres referred to above.

Preferably the permeable wall member is composed of one or more vaccum-formed shapes, which can be cemented together, or jointed by means of a spigot joint construction.

The use of a permeable wall duct to contain gases having a temperature above the melting point of the refractory fibre is readily achieved in the case of straight ducting. The cross-sectional shape of the duct preferably should be circular but an eliptical section is acceptable. A square or rectangular section is less satisfactory because the complex circulatory flow paths in the hot gas stream in the vicinity of each of the four corners of the cross section may interfere with the desired action of the cool gas in stabilising the boundary layer. Much greater care is required in the design of permeable wall ducts involving a change in direction. Small radii of curvature at a change in direction should be avoided if the protective action of the cool gas is to be effective.

The permeability of the porous wall member is not particularly critical always provided that it is uniform throughout. Conveniently, where the auxiliary fluid is a gas the permeability is within the range $10^{-5}$ to $10^{-9}$ cm$^2$ and preferably within the range $10^{-7}$ to $10^{-8}$ cm$^2$ calculated from the equation $$\frac{\text{poises} \times \text{cm}^4}{\text{sec} \times \text{dynes}} = (L\text{cm})^2$$

(Micromeritics. J. M. Dallavalle 2nd Ed. page 265 published by Pitman). The wall thickness for any value of permeability can be so selected to promote a uniform distribution of the flow of the auxiliary gas through the entire surface area of the wall member and is suitably in the range of 5 mm to 25 mm. This is an important feature in the practice of the invention since if the flow of auxiliary gas through the wall member is uneven there will be a tendency for hot spots to be formed, possibly resulting in localised deterioration of the refractory ceramic fibres forming the wall member. Suitably the flow of the auxiliary gas is in the range from 1 to 4 cm$^3$/sq. cm internal surface of wall member/second.

Conveniently the wall member is surrounded externally by a jacket to enable the establishment of a positive pressure in the auxiliary gas relative to the pressure within the vessel. The jacket may be of mild steel if the temperature of the auxiliary gas is sufficiently low. Preferably a filter is installed in the conduit supplying the auxiliary gas to the jacket. Such a filter may take the form of an easily replaceable portion of the permeable material of which the wall member is composed. The presence of a filter tends to reduce the tendency for the pores of the wall member to block with, for example, dust particles. In order to achieve a flow of auxiliary gas through the porous wall member the pressure gradient in the permeable wall member need not be very great. Therefore, even when the pressure of gas to be heated inside the vessel is relatively high the net stress to which the permeable wall itself is subjected is low. It is possible to operate this invention with low auxiliary gas temperatures even when the temperature of the gas being heated inside the vessel is high. In this event it is not necessary to take special precautions to insulate the outside of the jacket. The temperature of the auxiliary gas may be for example at from 10° C. to 100° C.

We have disclosed above that refractory ceramic fibres commercially available may tend to shrink slightly irreversibly at a temperature above about 1000° C. Preferably therefore the wall member is preheated to said temperature to allow this irreversible shrinkage to take place before being fitted into such support means as may be necessary. It is a particular advantage of the use of wall members made from refractory ceramic fibres that no further expansion or contraction occurs with temperature changes, and the wall members are therefore not subject to thermal shock problems. The low density of the permeable ceramic makes possible the use of lighter supporting members. Suitably shaped permeable wall members made by vacuum forming techniques are readily and cheaply obtainable and the use of such members represents a considerable plant cost saving.

When practising the invention there are low heat losses from the containing vessel even in the absence of external lagging with resulting high thermal efficiency in a process, for example, the vapour phase oxidation of titanium tetrachloride, with which the present invention may be used.

A particular embodiment of the invention above described will now be illustrated by means of the following Example, and with reference to the accompanying drawing.

EXAMPLE

FIG. 1 is a part longitudinal section, not to scale, through apparatus according to the invention.

The apparatus comprises an electrical discharge heater with ancilliary equipment and ducting 10 according to the invention surrounding the heating zone 11.

The electrical discharge heater comprises an electrode 1 cooled internally and having coolant fluid inlet and outlet 2, the electrode being mounted by insulating gasket 3 in the wall of container 4 equipped with gas inlet 5. The electrode extends out of the container through aperture 6 and is surrounded, so as to leave an annular space, by cooling jacket 7 of stainless steel. The end of the electrode 1 is flat and recessed within the cooling jacket so as to form in combination with the jacket a construction in the form of a bluff body flame holder. The cooling jacket 7 is equipped with inlet and outlet 9 for coolant fluid. A heating zone 11 is defined by ducting 10, which is a hollow cylindrical vacuum-formed sleeve of refractory ceramic fibres available under the Trade Mark Triton Kaowool, by the top 8 of the electrode 1 and the electrode 12. The electrode 12 is an annular hollow structure provided with inlets and outlets 13 for coolant fluid and an outlet 14 for heated gas. The ducting 10 is jacketed by jacket 15 and the space 16 is packed loosely with ceramic fibre wool available under the Trade Mark Triton Kaowool and is provided with inlet 17 for coolant fluid and is supported by impermeable heat resistant electrically non-conductive flanges 18.

The electrodes 1 and 12 are made of a silver/aluminum alloy, the jacket 7 is made of stainless steel and the jacketing 15 is made of mild steel. In use the coolant fluid fed to jackets 7 and electrode 12 was water and nitrogen at 280° K. was fed to space 16 so as to give a pressure of 25.5 kW/m$^2$ gauge at the outer surfaces of ducting 10. This represented a feed rate of 30 1 min$^{-1}$ into space 16.

After start-up of the electrical discharge heater in known manner the apparatus was run at the steady state of a feed of 80 1 min$^{-1}$ of nitrogen through inlet 5, to give a nitrogen pressure of 24.8 kN/m$^2$ gauge in the interior of the heating zone 11, and a potential gradient of 450 volts was maintained between the anode 8 and the cathode 12 to give a current of 28 amperes passing through the gas flowing between cathode and anode. Allowing for heat losses to the coolant fluid, 9.45 k VA of electrical power was introduced into the 80 1 min$^{-1}$ of nitrogen flowing through inlet 5 and thence through the heating zone 11. The temperature within the heating zone portion of the heating zone nearest to the electrode 1 was 3027° C. and that of the gas leaving the heating zone through opening 14 was 2727° C. The apparatus was operated for 6 hours during which time the ducting 10 showed no tendency to deteriorate.

What we claim is:

1. A method of temporarily containing a hot fluid in a chamber defined at least in part by a permeable wall member, the hot fluid having a temperature at least equal to the minimum deterioration temperature of the wall member, the hot fluid thereby having a deleterious effect on the wall member on contact therewith; which comprises; providing for the chamber at least one wall member constructed of heat insulating, refractory ceramic fibers comprising fibers of inorganic compounds selected from the group consisting of alumina, silica, zirconia and silica/alumina, the wall member having a density of from 0.16 to 0.80 g/cm$^3$ and a uniform permeability, to an auxiliary fluid having no deleterious effect on said wall member, of from $10^{-5}$ to $10^{-9}$ cm$^2$; causing said auxiliary fluid to permeate through the permeable wall member, under a pressure from outside the chamber and pass into the chamber, said auxiliary fluid having a temperature below the minimum deterioration temperature of the wall member and being non-deleterious toward the wall member and the fluid to be contained; introducing the fluid having a deleterious effect on the wall into the chamber under a pressure less than the pressure of the auxiliary fluid; and removing the fluid having a deleterious effect from the chamber; whereby the passage of the auxiliary fluid reduces the contact between the deleterious fluid and the wall member during the residence time of the deleterious fluid in said chamber.

2. A method as claimed in claim 1 wherein the fluid to be contained has a temperature of at least 2000° C.

3. A method as claimed in claim 2 wherein the auxiliary fluid passed has a temperature not greater than 100° C.

4. A method as claimed in claim 2 wherein the fluid to be contained is heated in said chamber by electrical discharge means.

5. A method as claimed in claim 1 wherein the wall member is provided in a vacuum formed shape.

6. A method as claimed in claim 1 wherein the fluid to be contained is a gas having a temperature of at least 2000° C., said wall member is constructed of refractory ceramic fibers having a permeability of from $10^{-5}$ to $10^{-9}$ cm$^2$ and wherein the auxiliary fluid is a gas having a temperature not greater than 100° C. when permeating through the permeable wall, said passing being at a flow rate of between 1 and 4 cm$^3$/sq. cm internal surface/second whereby the wall member is prevented from reaching its minimum deterioration temperature.

* * * * *

UNITED STATES PATENT AND TRADEMARK OFFICE
CERTIFICATE OF CORRECTION

PATENT NO. : 4,284,879
DATED : August 18, 1981
INVENTOR(S) : Geoffrey F. Eveson et al It is certified that error appears in the above—identified patent and that said Letters Patent is hereby corrected as shown below:

Col. 3, line 19; - "Moryanite" should read -- Morganite --

Col. 3, line 29; - "Sr" should read -- Zr --

Col. 3, line 33; - "1780-14" should read -- 1780 --

Col. 6, line 22; - "kW" should read -- kN --

Signed and Sealed this

Twentieth Day of October 1981

[SEAL]

Attest:

GERALD J. MOSSINGHOFF

Attesting Officer

Commissioner of Patents and Trademarks